(12) United States Patent
O'Rear

(10) Patent No.: US 8,523,959 B2
(45) Date of Patent: Sep. 3, 2013

(54) PARAFFINIC BIOLOGICALLY-DERIVED DISTILLATE FUELS WITH BIO-OXYGENATES FOR IMPROVED LUBRICITY AND METHODS OF MAKING SAME

(75) Inventor: Dennis J. O'Rear, Petaluma, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 1013 days.

(21) Appl. No.: 11/828,375

(22) Filed: Jul. 26, 2007

(65) Prior Publication Data

US 2009/0031617 A1 Feb. 5, 2009

(51) Int. Cl.
*C10L 1/18* (2006.01)
*C10L 1/04* (2006.01)

(52) U.S. Cl.
USPC ................................. 44/308; 44/385; 208/15

(58) Field of Classification Search
USPC .................. 44/308, 385; 208/108, 213, 15; 585/240, 733, 734
See application file for complete search history.

(56) References Cited

U.S. PATENT DOCUMENTS

| | | | |
|---|---|---|---|
| 4,859,312 A | 8/1989 | Miller | |
| 5,158,665 A | 10/1992 | Miller | |
| 5,300,210 A | 4/1994 | Zones et al. | |
| 6,180,842 B1 * | 1/2001 | Berlowitz et al. | 585/1 |
| 6,204,426 B1 | 3/2001 | Miller et al. | |
| 6,723,889 B2 | 4/2004 | Miller et al. | |
| 6,759,438 B2 * | 7/2004 | Rainis et al. | 518/700 |
| 6,776,897 B2 | 8/2004 | Bacha et al. | |
| 7,179,311 B2 | 2/2007 | O'Rear et al. | |
| 7,491,858 B2 * | 2/2009 | Murzin et al. | 585/240 |
| 2004/0055209 A1 * | 3/2004 | Jakkula et al. | 44/301 |
| 2004/0230085 A1 * | 11/2004 | Jakkula et al. | 585/240 |
| 2006/0161032 A1 * | 7/2006 | Murzin et al. | 585/240 |
| 2006/0207166 A1 * | 9/2006 | Herskowitz et al. | 44/385 |

FOREIGN PATENT DOCUMENTS

| | | |
|---|---|---|
| EP | 1741767 | 1/2007 |
| EP | 1741767 A1 * | 1/2007 |
| EP | 1795576 | 6/2007 |
| EP | 1795576 A1 * | 6/2007 |
| FI | 960525 | 8/1997 |
| WO | WO 2004/022674 | 3/2004 |
| WO | WO 2006/100584 | 9/2006 |

OTHER PUBLICATIONS

Askwith et al., "Chain length of additives in relation to lubricants in thin film and boundary lubrication," Proc. Royal Society, London, Series A, vol. 291 (1966), pp. 500-519.
Huber et al., "Synthesis of Transportation Fuels from Biomass: Chemistry, Catalysts, and Engineering," Chem. Rev. (2006), vol. 106, pp. 4044-4098
F. Pearce, "Fuels Gold," New Scientist, Sep. 23, 2006 pp. 36-41.
Vere, "Dilution Restores Lubricity," SAE Journal (1970), vol. 78(4), pp. 42-43.
Communication of a Notice of Opposition dated Mar. 4, 2013 regarding European Application No. 08796342.7 with attachment (18 pages).

* cited by examiner

*Primary Examiner* — James Goloboy
*Assistant Examiner* — Latosha Hines
(74) *Attorney, Agent, or Firm* — Edward T. Mickelson; Tiffany R. Weksberg

(57) ABSTRACT

The present invention is generally directed to methods for making fuels from biomass comprising triglyceride species, whereby the biomass is subjected to partial hydrodeoxygenation and (optionally) catalytic isomerization. The partial-hydrodeoxygenation of the triglyceride species produces a fuel that retains some oxygenates for enhanced lubricity.

30 Claims, No Drawings

PARAFFINIC BIOLOGICALLY-DERIVED DISTILLATE FUELS WITH BIO-OXYGENATES FOR IMPROVED LUBRICITY AND METHODS OF MAKING SAME

FIELD OF THE INVENTION

This invention relates to biologically-derived fuels comprising bio-oxygenates for improved lubricity and to methods (processes) of making such fuels, particularly wherein such methods comprise subjecting crop oil-derived triglycerides and fatty acids to partial or incomplete hydrodeoxygenation and, optionally, subsequent catalytic isomerization, and wherein such hydrodeoxygenation retains sufficient oxygenates to impart improved lubricity to the resulting biologically-derived fuel.

BACKGROUND OF THE INVENTION

With the current depletion rate of petroleum resources, alternative sources of fuel are desired. Production of distillate fuel from biological resources is one desirable option since it minimizes greenhouse gas formation (e.g., carbon dioxide). See Pearce, "Fuels Gold," New Scientist, 23 September, pp. 36-41, 2006.

Many distillate fuels prepared from biological resources are in the form of triglycerides (which have problems of high viscosity) or methyl esters of the fatty (carboxylic) acids derived from the triglyceride. These fuels are highly oxygenated and are quite different from conventional fuels. For example, they cannot be used as a jet fuel. See, e.g., Huber et al., "Synthesis of Transportation Fuels from Biomass: Chemistry, Catalysts, and Engineering," Chem. Rev., vol. 106, pp. 4044-4098, 2006.

It is desirable to prepare fuels that are similar to conventional fuels (primarily hydrocarbons) from these biological resources. One approach, as described in United States Patent Application Serial No. 20040230085, is to convert the oxygenates into paraffins by a combination of hydrodexoygenation and isomerization this results in a paraffinic product that contains sufficient isoparaffin-s to achieve cold climate specifications.

Unfortunately, isoparaffinic distillate fuels are known to have poor lubricity properties. See, e.g., Vere, "Dilution Restores Lubricity," SAE Journal, vol. 78(4), pp. 42-43, 1970. Conventional lubricity additives can be added to improve lubricity, but these are expensive, and from an environmental and/or process perspective, it is generally desirable to have as many components as possible derived from the biological resource.

As a result of the foregoing, an efficient, more cost-effective method of producing triglyceride-derived biofuels with sufficient lubricity is desirable.

BRIEF DESCRIPTION OF THE INVENTION

Addressing the above-described problems of using biologically-derived oils (including transesterified products thereof) directly as fuels, the present invention is generally directed to processes for modifying such oils so that they can be used as a broader range of fuels, particularly, wherein they comply with current transportation fuel specifications including, but not limited to, energy content, cold properties, and lubricity.

In some embodiments, the present invention is directed to methods comprising the steps of: (a) providing a biofuel precursor material, wherein the biofuel precursor material comprises triglycerides; (b) partially-hydrodeoxygenating triglycerides in the biofuel precursor material to yield a biofuel intermediate comprising linear hydrocarbon species and residual oxygenates; and (c) catalytically-isomerizing the biofuel intermediate using an isomerization catalyst to yield a biofuel comprising isoparaffins; wherein the above steps are carried out such that the resulting biofuel comprises paraffins in an amount greater than or equal to 90 wt %; isoparaffins in an amount greater than or equal to 50% of the paraffins; and oxygen, in the form of residual oxygenates, in an amount greater than or equal to 0.001 wt % on a water and air free basis; and wherein the resulting biofuel has a difference in the D86 90 and 10 percent points of 300° F. or less.

The foregoing has outlined rather broadly the features of the present invention in order that the detailed description of the invention that follows may be better understood. Additional features and advantages of the invention will be described hereinafter which form the subject of the claims of the invention.

DETAILED DESCRIPTION OF HE INVENTION

As mentioned above, in some embodiments, the present invention is directed to methods for modifying biologically-derived oils for use as transportation and/or other fuels, e.g., particularly in the case of the former, such that they comply with current transportation fuel specifications including, but not limited to, energy content, cold properties, and lubricity requirements. Accordingly, in some embodiments, the present invention is generally directed to methods for making fuels from biomass by subjecting triglyceride-bearing biomass to mild hydroprocessing and, optionally, catalytic isomerization. The mild hydroprocessing of the triglyceride-bearing biomass serves to partially-hydrodeoxygenate at least some of the triglycerides, thereby retaining some oxygenates in the biofuel product, whereby the oxygenates provide enhanced lubricity.

1. Definitions

The term "biofuel," as defined herein, is a fuel that is biologically-derived, i.e., from a biofuel precursor of biological origin. Such a term is generally accepted as being exclusive of fossil fuels. Examples of biofuels used as transportation fuels include biodiesel and ethanol. Sources for the production of biofuel include plant and animal matter. Note that biofuels can be blended with other fuels to create hybrid fuels.

The term "biofuel precursor," as defined herein is a biomass source for the production of biofuel.

The term "biofuel intermediate," as defined herein, is a processed species requiring some additional level of upgrading prior to its use as a fuel or a specific type of fuel.

A "triglyceride," as defined herein, is a triester of glycerin (glycerol) being molecular species having the following molecular structure:

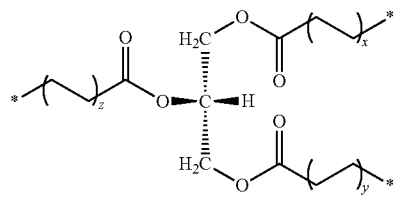

where x, y, and z can be the same or different, and wherein one or more of the branches defined by x, y, and z can have one or more unsaturated regions (i.e., carbon-carbon double bonds). For the production of diesel fuels, for example, it is often desirable that at least one of x, y, and/or z be equal to 4 to 10, such that, upon hydrodeoxygenation, they yield paraffins in the C9 to C21 range.

"Hydrodeoxygenation," as defined herein, is a type of hydroprocessing involving the thermal and/or catalytic deoxygenation of oxygenated species in the presence of hydrogen. Similarly, "partial-hydrodeoxygenation," refers to an incomplete deoxygenation of at least some of the oxygenated species present in a quantity of material that undergoes hydrodeoxygenation.

"Isomerizing," as defined herein, refers to the structural rearrangement of bonds in a linear hydrocarbon chain to form branched hydrocarbon isomers. Such isomerization generally proceeds by way of a catalytic route.

"Jet fuel," as defined herein, is a material suitable for use in turbine engines for aircraft or other uses meeting the current version of at least one of the following specifications: ASTM D1655-99, DEF STAN 91-91/3 (DERD 2494), TURBINE FUEL, AVIATION, KEROSINE TYPE, JET A-1, NATO CODE: F-35; International Air Transportation Association (IATA) "Guidance Material for Aviation Turbine Fuels Specifications", 4th edition, March 2000; and United States Military Jet fuel specifications MIL-DTL-5624 (for JP-4 and JP-5) and MIL-DTL-83133 (for JP-8).

"Diesel fuel," as defined herein, is a material suitable for use in diesel engines and conforming to the current version at least one of the following specifications: ASTM D 975—"Standard Specification for Diesel Fuel Oils"; European Grade CEN 90; Japanese Fuel Standards JIS K 2204; The United States National Conference on Weights and Measures (NCWM) 1997 guidelines for premium diesel fuel; and The United States Engine Manufacturers Association recommended guideline for premium diesel fuel (FQP-1A).

2. Standards

ASTM D86—Standard Test Method for Distillation of Petroleum Products at Atmospheric Pressure (ASTM International).

ASTM D6468—Standard Test Method for High Temperature Stability of Distillate Fuels.

3. Methods

In some embodiments, the present invention is directed to methods comprising the steps of: (Step 1) providing a biofuel precursor material, wherein the biofuel precursor material comprises triglycerides; (Step 2) partially-hydrodeoxygenating triglycerides in the biofuel precursor material to yield a biofuel intermediate comprising linear hydrocarbon species and residual oxygenates; and (Step 3) catalytically-isomerizing the biofuel intermediate using an isomerization catalyst to yield a biofuel comprising isoparaffins, wherein the above steps are carried out such that the resulting biofuel comprises paraffins in an amount greater than or equal to 90 wt %; isoparaffins in an amount greater than or equal to 50% of the paraffins; and oxygen, in the form of residual oxygenates, in an amount greater than or equal to 0.001 wt % on a water and air free basis; and wherein the resulting bio fuel generally has a difference in the ASTM D86 90 and 10 percent points of 300° F. or less, typically 250° F. or less, and more typically 150° F. or less.

In some embodiments, the biofuel precursor material generally comprises at least 25 weight percent triglycerides, and typically at least 50 weight percent triglycerides. In these or other embodiments, the biofuel precursor material is selected from the group consisting of crop oils (vegetable oils), microalgae, animal fats, and combinations thereof.

In some embodiments, the step of partially-hydrodeoxygenating involves mild or moderate hydroprocessing of the triglyceride-bearing biofuel precursor material. In some embodiments, this step involves a catalytic pathway. In some such embodiments, the catalytic pathway comprises a supported metal catalyst, the supported metal catalyst comprising a metal or metal alloy such as, but not limited to, Pd, Pt, Ni, Mo, Co, and combinations thereof. Generally, partially-hydrodeoxygenating incompletely deoxygenates at least some of the triglycerides present in the biofuel precursor, thereby providing at least some of the residual oxygenates, Such residual oxygenates include, but are not limited to, glycerol, carboxylic acids, ethers, esters, alcohols, and combinations thereof. See, e.g., United States Patent Application Serial No. 20040230085.

In some embodiments, the biofuel intermediate comprises linear hydrocarbon species having between 5 and 20 carbon atoms, the chain length generally being associated with the length of the chains on the triglyceride and/or fatty acid species present in the biofuel precursor material.

In some embodiments, the presence of branched hydrocarbon species in the biofuel product serves to modify the properties (e.g., cold climate) of said biofuel.

In some embodiments, the biofuel comprises paraffins in an amount greater than or equal to 95 aft %. In these or other embodiments, the isoparaffins can account for 70 wt % of the total paraffins in the biofuel. In these or other embodiments, the residual oxygenates typically comprise no more than 1 wt % of the biofuel on a water and air free basis, and more typically no more than 0.1 wt %.

In some embodiments, the above-described step of partially-hydrodeoxygenating the triglycerides is carried out in an upflow reactor configuration, wherein the upflow reactor configuration can permit unwanted carbonaceous deposits formed during the partial-hydrodecarboxylation to be continuously swept out of the reactor. In some embodiments, the upflow reactor operates at pressures whereby at least a portion of the triglycerides remain in the liquid phase. In these or other embodiments, the upflow reactor operates at temperatures below the decomposition point of the triglycerides, and wherein energy needed for the partial-hydrodeoxygenation is provided via a heated hydrogen feed into the reactor.

Because biological triglycerides (especially those from plants) are often unsaturated, in some embodiments the above-described step of partially-hydrodeoxygenating the triglycerides should saturate at least a portion of the olefins while not removing all of the oxygenates. Note that olefins can lead to product instability, and in some embodiments, the final biofuel product should have a satisfactory stability as defined by a reflectance as measured by ASTM D6468 of greater than 65% when measured at 150° C. for 90 minutes. See, e.g., O'Rear et al., U.S. Pat. No. 7,179,311; and Bacha et al., U.S. Pat. No. 6,776,897.

Note that such above-mentioned biofuel intermediates could be utilized as fuels in their own right, but that isomerization provides a broader range of biofuel products, thereby making the process more universal and flexible.

In some above-described method embodiments, the step of catalytically-isomerizing the biofuel intermediate comprises use of an isomerization catalyst. Suitable isomerization catalysts can include, but are not limited to Pt or Pd on a support such as, but further not limited to, SAPO-11, SM-3, SSZ-32, ZSM-23, ZSM-22, and similar such supports. In some or other embodiments, the step of catalytically-isomerizing the decarboxylated biofuel intermediate comprises use of a Pt or Pd catalyst supported on an acidic support material selected from the group consisting of beta or zeolite Y molecular sieves, $SiO_2$, $Al_2O_3$, $SiO2-Al_2O_3$, and combinations thereof. In some such embodiments, the catalytic isomerization is carried out at a temperature between about 500° F. and about 750° F. The operating pressure is typically 200-2000 psig, and more typically 200-1000 psig. The hydrogen flow rate is typically 500-5000 SCF/barrel. For other suitable isomerization catalysts, see Zones et al., U.S. Pat. No. 5,300,210; Miller, U.S. Pat. No. 5,158,665; and Miller, U.S. Pat. No. 4,859,312.

With regard to the catalytic isomerization step described above, in some embodiments, the methods described herein may be conducted by contacting the biofuel intermediate with a fixed stationary bed of catalyst, with a fixed fluidized bed, or with a transport bed. In one presently contemplated embodiment, a trickle-bed operation is employed, wherein such feed is allowed to trickle through a stationary fixed bed, typically in the presence of hydrogen. For an illustration of the operation of such catalysts, see Miller et al., U.S. Pat. Nos. 6,204, 426 and 6,723,889.

In the above method embodiments, the steps of partially-hydrodecarboxylating and catalytically-isomerizing typically are carried out sequentially. In some embodiments, a combination of simultaneous and sequential steps could be employed which would involve a partial, but not complete, temporal overlap of the two steps.

In some embodiments, the above-described method further comprises a step of monitoring oxygen levels during processing so that processing parameters can be modulated to yield a desired oxygen content in the final product, as desired. Suitable methods of monitoring such oxygen levels include, but are not limited to, gas chromatography-atomic emission detection (GC-AED), and similar such techniques. See, e.g., Rainis et al., U.S. Pat. No. 6,759,438.

In some embodiments, the biofuel is blended with other fuels or biofuels. In some or other embodiments the biofuel intermediate is blended with other species prior to undergoing catalytic isomerization. In some or other embodiments, the biofuel intermediate is blended with the biofuel to generate a hybrid product. This latter embodiment affords additional flexibility in which to modulate the levels of oxygenates in the final product.

In some typical embodiments, the product biofuel is a transportation fuel such as, but not limited to, diesel, JP-8 (U.S. Military Standard MIL-DTL-83133), JP-5 (U.S. Military Standard MIL-PRF-56245), Jet A (ASTM Standard D 1655), and the like.

4. Products

In addition to the methods described above, the present invention is also directed to the novel products produced by such methods. Accordingly, in some embodiments, the present invention is directed to a biofuel comprising paraffins in an amount greater than or equal to 90 wt %; isoparaffins in an amount greater than or equal to 50% of the paraffins; and oxygen, in the form of residual oxygenates, in an amount greater than or equal to 0.001 wt % on a water and air free basis, wherein the biofuel has a difference in the D86 90 and 10 percent points of 300° F. or less; and wherein the biofuel is made by a method comprising the steps of (a) providing a biofuel precursor material, wherein the biofuel precursor material comprises triglycerides; (b) partially-hydrodeoxygenating triglycerides in the biofuel precursor material to yield a biofuel intermediate comprising linear hydrocarbon species and residual oxygenates; and (c) catalytically-isomerizing the biofuel intermediate using an isomerization catalyst to yield a biofuel comprising isoparaffins. In some such embodiments, the biofuel product has a reflectance as measured by ASTM D6468 of greater than 65% when measured at 150° C. for 90 minutes.

5. Variations

In addition to the various embodiments described above, it is worth noting that significant variability can be introduced via the biofuel precursor material itself, particularly with respect to the content, type, and range of triglyceride/carboxylic acid species contained therein. Such biofuel precursor material can be extracted directly from a biomass source (e.g., vegetable oils), or they can be generated from biomass sources via one or more additional processing steps. Additionally, some biofuel precursor materials may further comprise components of: non-biological origin, particularly in the case of waste oils and the like.

6. Advantages

As previously mentioned, in some embodiments, the present invention provides efficient routes to a variety of transportation or other fuels using a triglyceride-containing biofuel precursor. This is in large part because oxygenates, present for lubricity are not subsequently added, but generated or retained in situ during processing of the biofuel precursor material.

It has been shown that when oxygenated lubricity additives comprise the same number of carbons as the paraffin-based fuel to which they are added, their concentration can be minimized. See, e.g., Askwith et al., "Chain Length of Additives in Relation to Lubricants in Thin Film and Boundary Lubrication," Proc. Royal. Soc., vol. A291, pp. 500-519, 1966. By generating the oxygenates in situ from the triglycerides used to derive the fuel, variation in carbon number between the oxygenates and the paraffins can be virtually eliminated.

7. Summary

In summary, the present invention is generally directed to methods for making fuels from biomass comprising triglyceride species, whereby the biomass is subjected to partial hydrodeoxygenation and, optionally, catalytic isomerization. The partial-hydrodeoxygenation of the triglyceride species produces a fuel that retains some oxygenates for enhanced lubricity, and the in situ generation and/or retention of such oxygenates affords greater efficiency and better control over existing processes.

All patents and publications referenced herein are hereby incorporated by reference to the extent not inconsistent herewith, It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed:

1. A method comprising the steps of:
   (a) providing a biofuel precursor material, wherein the biofuel precursor material comprises triglycerides;
   (b) partially-hydrodeoxygenating triglycerides in the biofuel precursor material to yield a biofuel intermediate comprising linear hydrocarbon species and residual oxygenates; and
   (c) catalytically-isomerizing at least a portion of the biofuel intermediate using an isomerization catalyst to yield a biofuel comprising isoparaffins and residual oxygenates;
   wherein the steps of partially-hydrodeoxygenating and catalytically isomerizing are carried out sequentially, and wherein the above steps are carried out such that the resulting biofuel comprises paraffins in an amount greater than or equal to 90 wt %; isoparaffins in an amount greater than or equal to 50% of the paraffins; and oxygen, in the form of residual oxygenates, in an amount greater than or equal to 0.001 wt % on a water and air free basis; and wherein the resulting biofuel has a difference in the ASTM D86 90 and 10 percent points of 300° F. or less.

2. A method comprising the steps of:
   (a) providing a biofuel precursor material, wherein the biofuel precursor material comprises triglycerides;
   (b) partially-hydrodeoxygenating triglycerides in the biofuel precursor material to yield a biofuel intermediate comprising linear hydrocarbon species and residual oxygenates;
   (c) catalytically-isomerizing at least a portion of the biofuel intermediate using an isomerization catalyst to yield a biofuel comprising isoparaffins and residual oxygenates; and
   (d) analyzing oxygen content while said method is being carried out,
   wherein the steps of partially-hydrodeoxygenating and catalytically isomerizing are carried out sequentially, wherein the step of partially-hydrodeoxygenating the triglycerides is carried out in an upflow reactor configuration, wherein the above steps are carried out such that the resulting biofuel comprises paraffins in an amount greater than or equal to 90 wt %; isoparaffins in an amount greater than or equal to 50% of the paraffins; and oxygen, in the form of residual oxygenates, in an amount greater than or equal to 0.001 wt % on a water and air free basis; and wherein the resulting biofuel has a difference in the ASTM D86 90 and 10 percent points of 300° F. or less, and wherein the biofuel precursor material comprises at least 25 weight percent triglycerides.

3. The method of claim 2, wherein the biofuel precursor material comprises at least 50 weight percent triglycerides.

4. The method of claim 2, wherein the biofuel precursor material is selected from the group consisting of crop oils, microalgae, animal fats, and combinations thereof.

5. The method of claim 2, wherein the step of partially-hydrodeoxygenating involves a catalytic pathway.

6. The method of claim 5, wherein the catalytic pathway comprises a supported metal catalyst, the supported metal catalyst comprising a metal or metal alloy selected from the group consisting of Pd, Pt, Ni, Mo, Co, and combinations thereof.

7. The method of claim 2, wherein the step of partially-hydrodeoxygenating incompletely deoxygenates at least some of the triglycerides, thereby providing at least some of the residual oxygenates.

8. The method of claim 2, wherein the biofuel intermediate comprises residual oxygenates selected from the group consisting of glycerol, carboxylic acids, ethers, esters, alcohols, and combinations thereof.

9. The method of claim 2, wherein the biofuel intermediate comprises linear hydrocarbon species having between 5 and 20 carbon atoms.

10. The method of claim 2, wherein the step of catalytically-isomerizing involves an isomerization catalyst comprising metal selected from the group consisting of Pt, Pd, and combinations thereof.

11. The method of claim 2, wherein the step of catalytically-isomerizing isomerizes at least some of the linear hydrocarbon species to yield branched hydrocarbon species.

12. The method of claim 11, wherein the presence of branched hydrocarbon species serves to modify the fuel properties.

13. The method of claim 2, wherein the biofuel comprises paraffins in an amount greater than or equal to 95 wt %.

14. The method of claim 2, wherein the isoparaffins account for 70 wt % of the total paraffins in the biofuel.

15. The method of claim 2, wherein residual oxygenates comprise no more than 1 wt % of the biofuel on a water and air free basis.

16. The method of claim 2, wherein residual oxygenates comprise no more than 0.1 wt % of the biofuel on a water and air free basis.

17. The method of claim 2, wherein the resulting biofuel has a difference in the D86 90 and 10 percent points of 250° F. or less.

18. The method of claim 2, wherein the resulting biofuel has a difference in the D86 90 and 10 percent points of 150° F. or less.

19. The method of claim 2, wherein the biofuel produced is a transportation fuel.

20. The method of claim 2, wherein the transportation fuel is selected from the group consisting of JP-8, diesel, JP-5, Jet A, and combinations thereof.

21. The method of claim 2, wherein the upflow reactor configuration allows for unwanted carbonaceous deposits formed during the partial-hydrodecarboxylation to be continuously swept out of the reactor.

22. The method of claim 2, wherein the upflow reactor operates at pressures whereby at least a portion of the triglycerides remain in the liquid phase.

23. The method of claim 2, wherein the upflow reactor operates at temperatures below the decomposition point of the triglycerides, and wherein energy needed for the partial-hydrodeoxygenation is provided via a heated hydrogen feed into the reactor.

24. The method of claim 2, wherein the biofuel has a reflectance, as measured in accordance with ASTM D6468, of greater than 65% when measured at 150° C. for 90 minutes.

25. The method of claim 2, wherein the step of analyzing is continuous.

26. The method of claim 2, wherein the step of analyzing is discrete.

27. The method of claim 2, wherein the step of analyzing guides parameter modulation in producing a biofuel having a particular oxygen content.

28. The method of claim 2, wherein the biofuel is blended with other species selected from the group consisting of other biofuels, the biofuel intermediate, other fuels, other oxygenates, and combinations thereof.

29. The method of claim 1, wherein the step of partially-hydrodeoxygenating the triglycerides is carried out in an upflow reactor configuration, and wherein said upflow reaction configuration allows for unwanted carbonaceous deposits formed during the partial-hydrodecarboxylation to be continuously swept out of the reactor.

30. The method of claim 1, further comprising a step of analyzing oxygen content while carrying out the method, wherein the step of analyzing guides parameter modulation in producing a biofuel having a particular oxygen content.

* * * * *